US008212841B2

(12) United States Patent
Clodfelter

(10) Patent No.: US 8,212,841 B2
(45) Date of Patent: Jul. 3, 2012

(54) NON-LINEAR IMAGE MAPPING USING A PLURALITY OF NON-COPLANAR CLIPPING PLANES

(75) Inventor: Robert Mark Clodfelter, Dayton, OH (US)

(73) Assignee: Barco N.V., Kortrijk (BE)

( * ) Notice: Subject to any disclaimer, the term of this patent is extended or adjusted under 35 U.S.C. 154(b) by 722 days.

(21) Appl. No.: 11/822,477

(22) Filed: Jul. 6, 2007

(65) Prior Publication Data

US 2008/0012879 A1 Jan. 17, 2008

Related U.S. Application Data

(60) Provisional application No. 60/830,336, filed on Jul. 13, 2006.

(30) Foreign Application Priority Data

Jul. 7, 2006 (EP) .................................... 06447090

(51) Int. Cl.
*G09G 5/14* (2006.01)

(52) U.S. Cl. ........................................................ 345/623

(58) Field of Classification Search .................. 345/623
See application file for complete search history.

(56) References Cited

U.S. PATENT DOCUMENTS

| | | | | |
|---|---|---|---|---|
| 5,136,390 | A * | 8/1992 | Inova et al. | 348/383 |
| 5,902,030 | A * | 5/1999 | Blanchard | 353/30 |
| 6,219,099 | B1 * | 4/2001 | Johnson et al. | 348/383 |
| 6,456,339 | B1 * | 9/2002 | Surati et al. | 348/745 |
| 6,848,792 | B1 * | 2/2005 | De Meerleer | 353/30 |
| 7,468,778 | B2 * | 12/2008 | Thomas et al. | 352/85 |
| 7,518,615 | B1 * | 4/2009 | Airey et al. | 345/519 |
| 2004/0184013 | A1 * | 9/2004 | Raskar et al. | 353/121 |
| 2005/0099603 | A1 * | 5/2005 | Thomas et al. | 352/85 |
| 2008/0225048 | A1 * | 9/2008 | Bijankumar et al. | 345/421 |
| 2010/0079471 | A1 * | 4/2010 | Airey et al. | 345/519 |

FOREIGN PATENT DOCUMENTS

| | | | |
|---|---|---|---|
| GB | 2 317 297 | A | 3/1998 |
| WO | WO 01/60058 | A1 | 8/2001 |
| WO | WO 2004/086755 | A | 10/2004 |
| WO | WO 2004086755 | A1 * | 10/2004 |

OTHER PUBLICATIONS

Alan Watt et al., "Advanced Animation and Rendering Techniques, Theory and Practice", ACM Press, New York, NY, 1992.

* cited by examiner

*Primary Examiner* — Javid A Amini
(74) *Attorney, Agent, or Firm* — Bacon & Thomas, PLLC

(57) ABSTRACT

A display processing system for providing video signals for displaying an image is provided. The display processing system comprises input channels for receiving a plurality of component images, each component image being a portion of the complete image for display, the image data of each component image being defined by a view frustum having a clipping plane, and a combiner for combining the image data of the component images. According to the present invention, at least two clipping planes of two of the view frustums are non-coplanar. Such display processing system corrects for the defect of driving angular resolution to the edges of the field of view of a display system, in particular for large field-of-view display systems, and balances the overall system angular resolution by allowing each image generator channel to render to an optimal view frustum for its portion of the complete image.

20 Claims, 12 Drawing Sheets

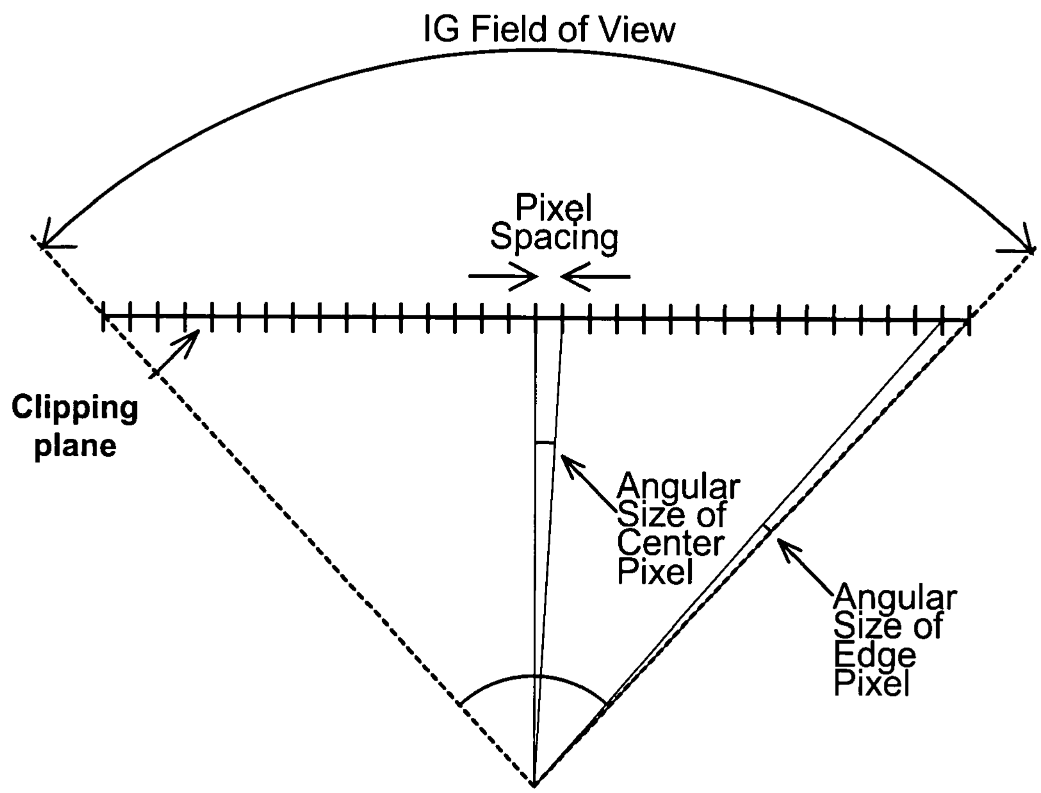
Fig. 1 – PRIOR ART
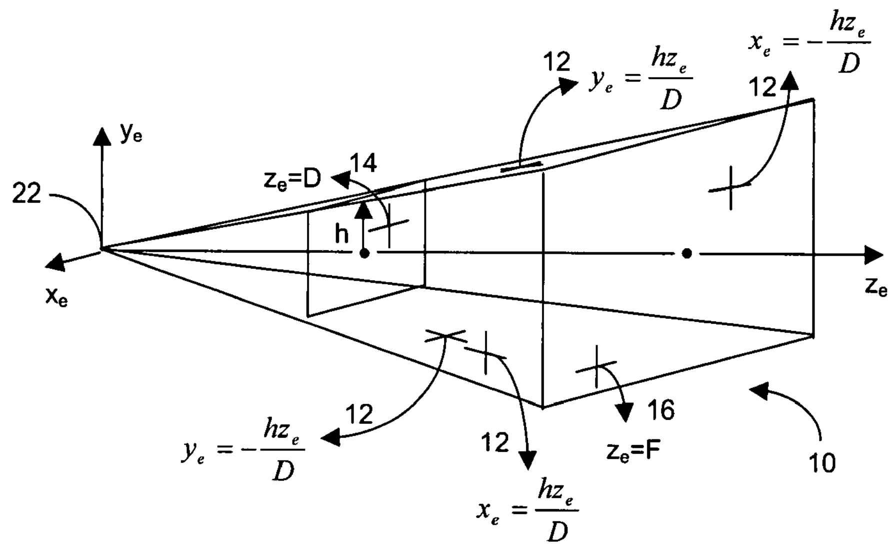
Fig. 2

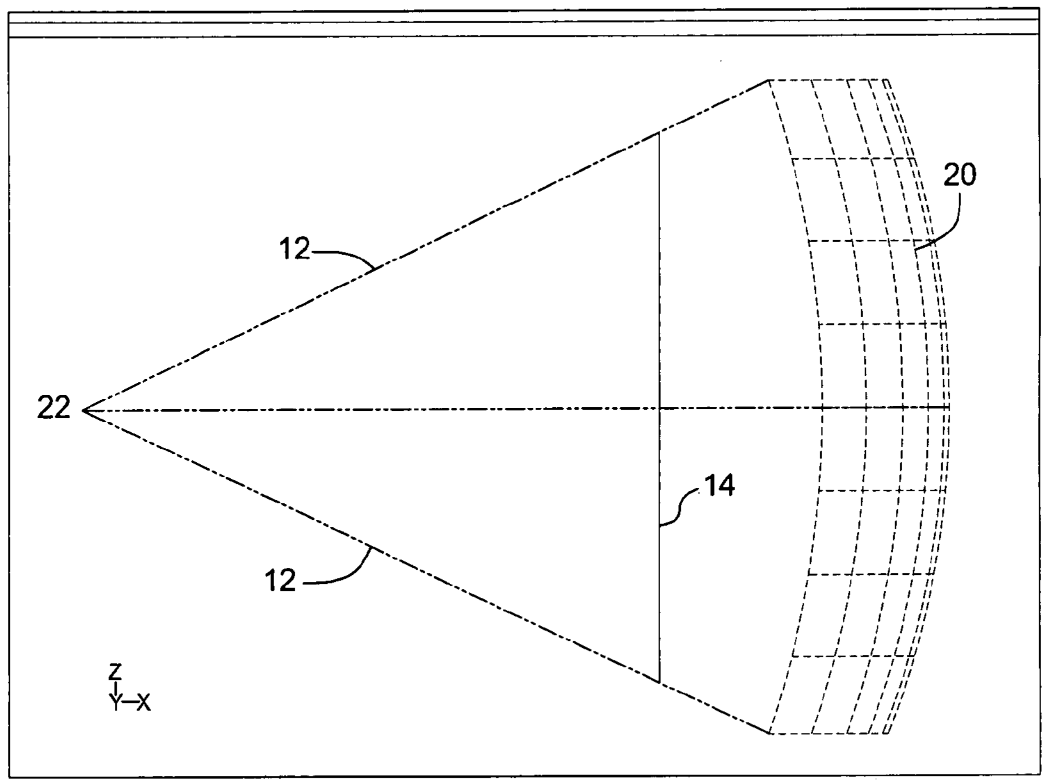
Fig. 3 - PRIOR ART
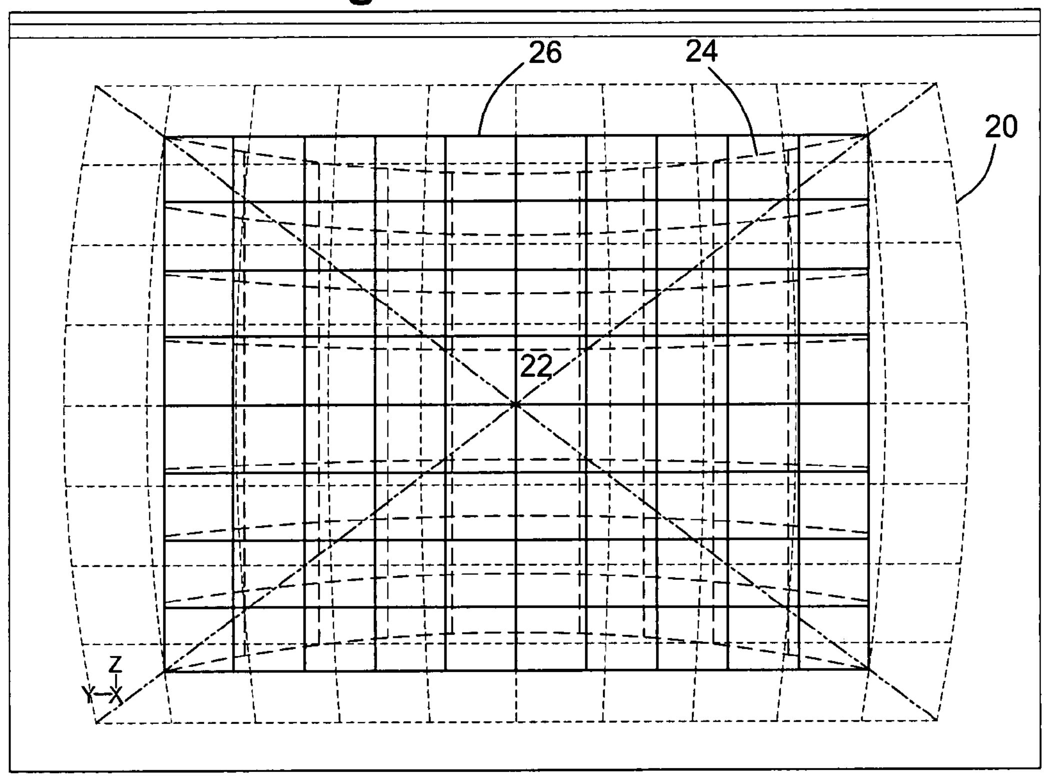
Fig. 4 - PRIOR ART

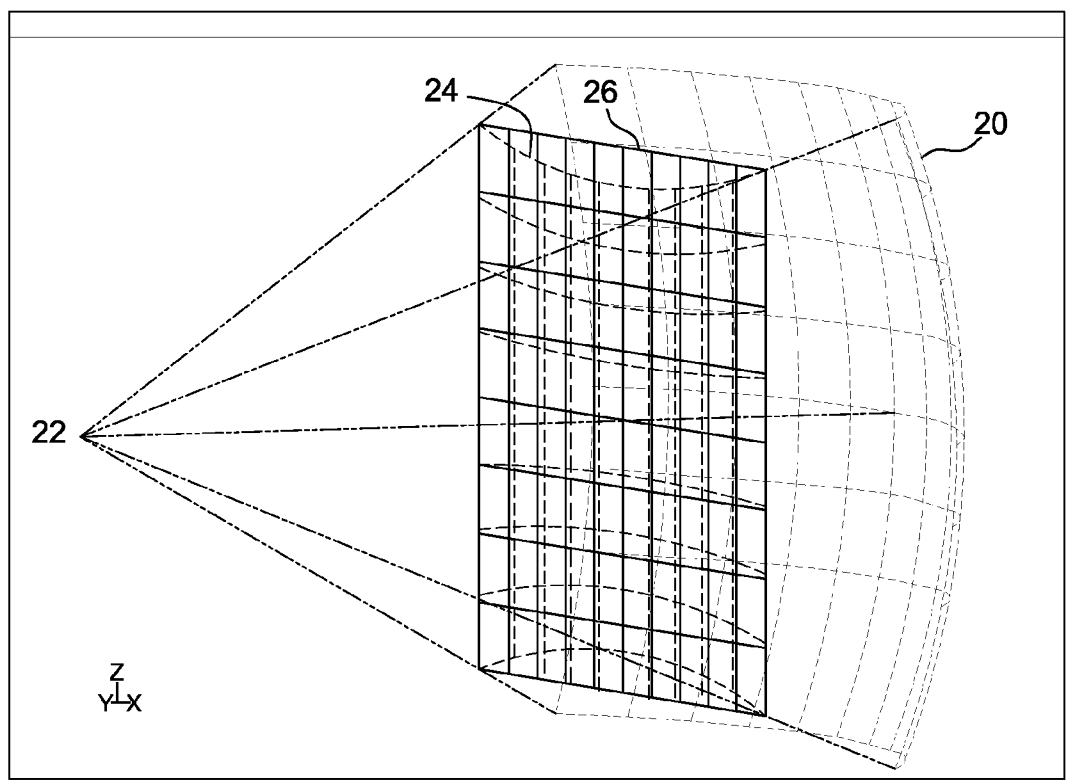
Fig. 5 - PRIOR ART
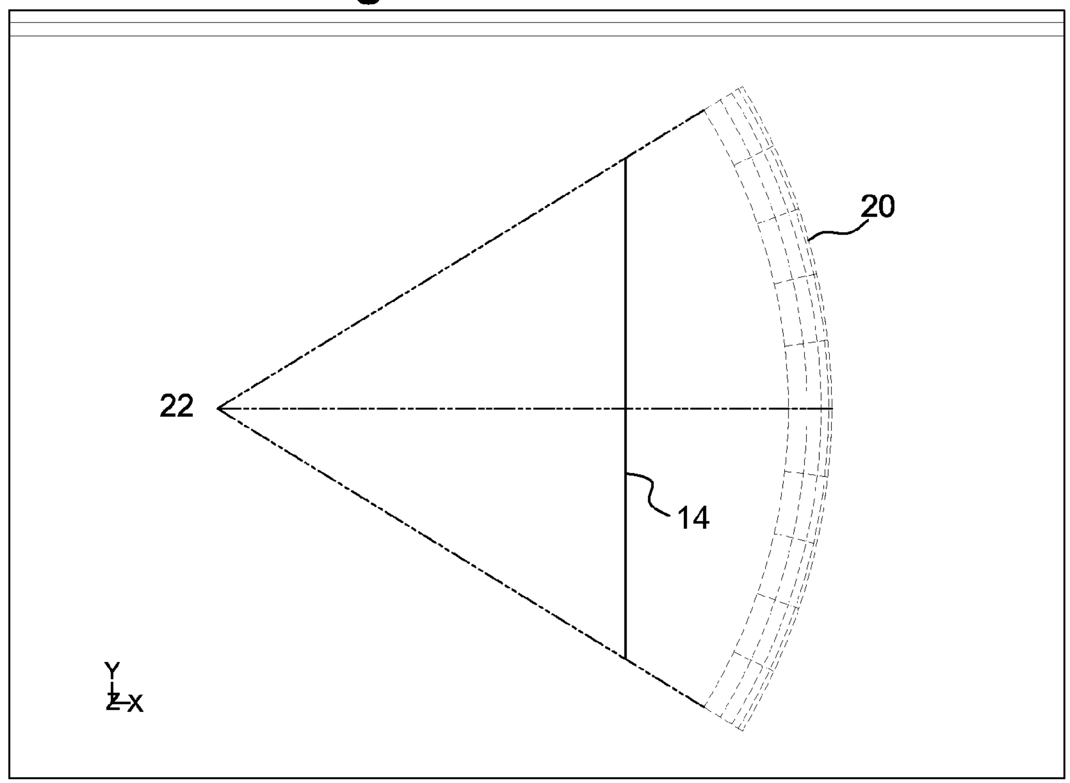
Fig. 6 - PRIOR ART

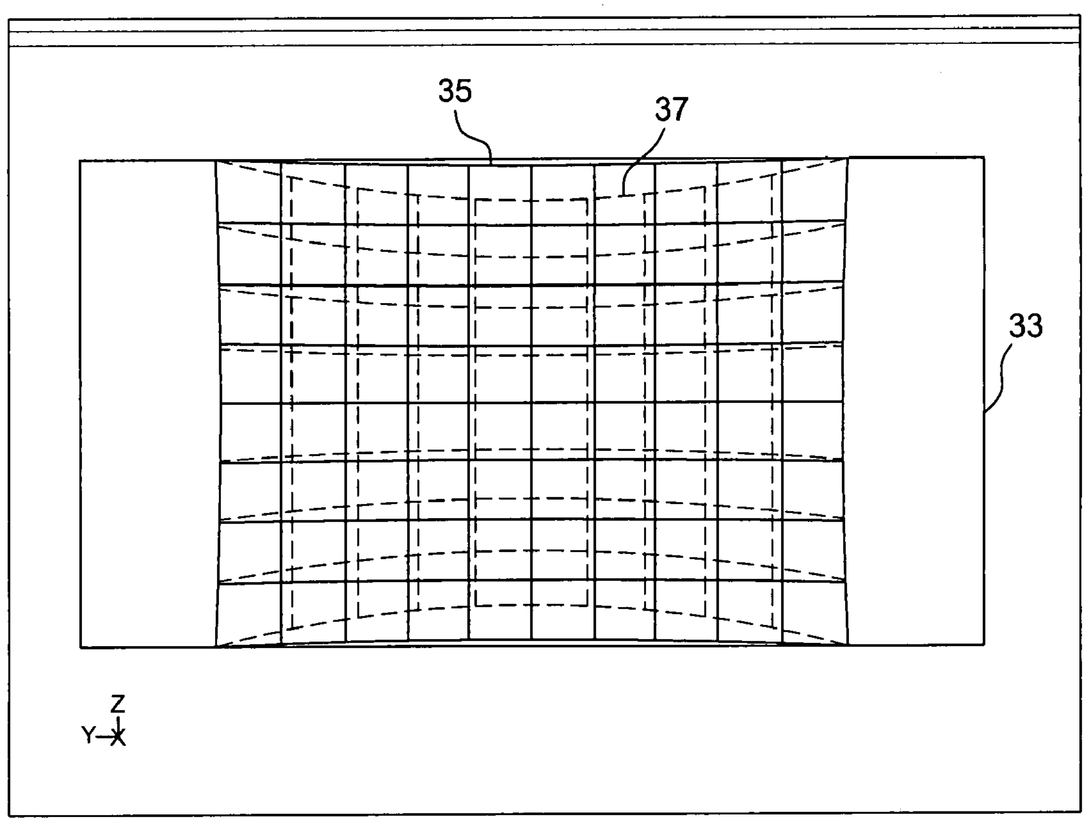
Fig. 11 - PRIOR ART
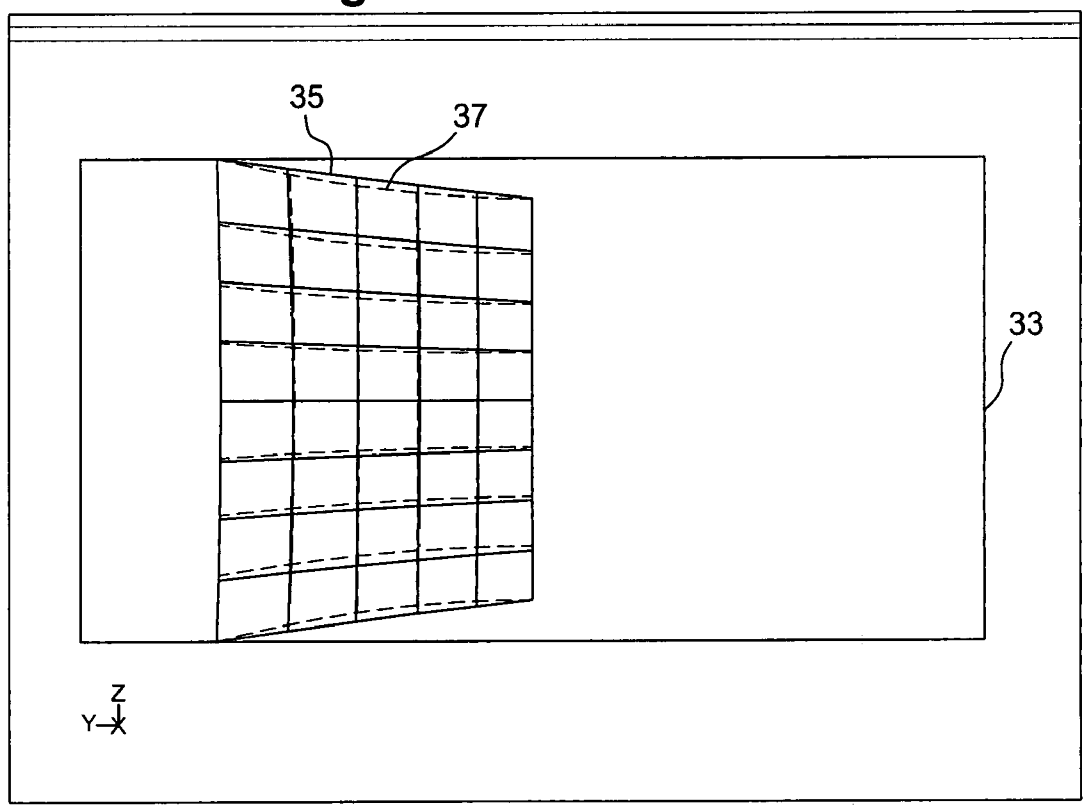
Fig. 12

NON-LINEAR IMAGE MAPPING USING A PLURALITY OF NON-COPLANAR CLIPPING PLANES

CROSS-REFERENCE TO RELATED APPLICATIONS

The benefit of U.S. Provisional Application No. 60/830,336 filed Jul. 13, 2006 is claimed under 35 U.S.C. §119(e) and the entirety of said application is incorporated herein by reference.

TECHNICAL FIELD OF THE INVENTION

The present invention relates to display systems (comprising display means for displaying images) or display processing systems (comprising means for generating video outputs, but no display means for displaying those video outputs), for example projection systems for projection of images on a screen. The present invention may be particularly useful for high resolution large field-of-view display systems that may be used, for example, in entertainment, flight, vehicle, marine or leisure simulators, or in presentation applications.

BACKGROUND OF THE INVENTION

A challenge to industry exists in the current market as the resolution of available display technologies exceeds that of typical image generation and distribution infrastructure. In addition, the extremely high resolution of existing displays drives users to want larger and larger angular fields of view from a single display device.

Many large field-of-view display systems rely on a plurality of display devices, e.g. projectors, each providing a part of the image to be displayed. For example, GB-2317297 describes an image projection system for use in a large field-of-view presentation. The apparatus comprises a screen, a plurality of projectors and a plurality of beam splitters, the image display apparatus being such that each projector has its own beam splitter. The projectors and their beam splitters are arranged to be around an observer in such a way that the equivalent projection point or points are at or near to the observer's eye-point so as to form an image at a surface of the screen whereby the image is substantially geometrically correct when viewed from a location at or near to the observer and whereby there is no need for substantial pre-distortion of the image within the projector. As another example, U.S. Pat. No. 5,902,030 discloses a projection system having a plurality of off-axis projectors and a screen assembly including a display screen. The first off-axis projector produces a first image that is directed onto a first segment of the screen assembly, and the second off-axis projector produces a second image that is directed onto a second segment of the screen assembly. The second image interfaces the first image at a center axis of the screen assembly, both images intersecting the center axis at a substantially normal angle.

An alternative solution, making use of a single projector, is described in U.S. Pat. No. 6,848,792. In this case a projection device is disclosed which comprises at least two high resolution input channels for receiving high resolution input signals, e.g. from image generators, and a recombination system for combining the high resolution input signals into one combined input signal with a format larger than the format of any of the input signals. The combined input signal is applied to a high resolution image forming display device for displaying an image corresponding to the high resolution imaging signal, and the imaged high resolution imaging signal is projected onto a visualisation surface.

Such a typical single display ultra-high resolution system consists of a number of independent image generators rendering to co-planar asymmetric clipping planes, as illustrated in FIG. 1. The output of each image generator is connected to a multiple video input ultra-high resolution projector, where the clipping planes are put side by side on a large multi-image panel. In this configuration, the angular extent of the pixels at the outside edges of the two clipping planes is much smaller than that of the pixels near the center of the two clipping planes. The majority of the angular resolution is driven to the edges of the complete field of view, which is counter to the desires of most users.

SUMMARY OF THE INVENTION

It is an object of embodiments of the present invention to provide good apparatus or methods for displaying large field-of-view images.

The above objective is accomplished by a device and method according to embodiments of the present invention.

The present invention corrects for the defect of driving angular resolution to the edges of the field of view of a display system, in particular for large field-of-view display systems, and balances the overall system angular resolution by allowing each image generator channel to form an image, e.g. render an image, to an optimal clipping plane for its portion of the complete image.

In a first aspect, the present invention provides a display processing system for providing video signals for displaying an image. The display processing system comprises input channels for receiving a plurality of component images, each component image being a portion of the complete image for display, the image data of each component image being defined by a view frustum having a clipping plane, and a combiner for combining the image data of the component images. With respect to component images, an object to be displayed in one image may overlap into a neighboring component image. Objects to be displayed, for example, in one component image may migrate into another component image during a video sequence such that the complete image to be displayed is the display of a scene of which the component images form parts thereof. According to the present invention, at least two clipping planes of two of the view frustums are non-coplanar.

By image data being defined by a view frustum is meant the processing of all image data in order to distinguish objects lying outside the view frustum from objects lying inside the view frustum.

According to embodiments of the present invention, a plurality of frustums, also referred to as viewing planes, are used to define multiple images to be processed and displayed by one projector.

The above first aspect defines an image processing box that may have multiple video inputs and outputs, with possibly multiple warp processors, and one or more combiners which processes the video as described in accordance with the present invention. The images on the inputs and outputs may be segmented in many alternative ways such as tiles, rows, columns, time sequential, etc.

The combiner may have means for warping of the image data so that at least one of the component images is displayed in a corrected form as desired by a user. It is an advantage of the present invention to have two or more (depending on the number of component images) independently controllable warping functions each processing a component image and combining them into one contiguous image. Such a configuration has the additional advantage that the warping necessary to combine the component images may be combined with additional warping operations that may be necessary as part of the display system to achieve a geometrically correct image when properly observed in the display system.

According to embodiments of the present invention, the display processing system may furthermore comprise means for providing a plurality of component images, to be received by the input channels of the display processing system. The means for providing a plurality of component images may be at least one image generator (IG). In case of just one IG being present, this IG would form a number of images, e.g. render a number of images each with its own non-coplanar clipping plane to be combined in the combiner. The images could be sequentially generated or they could be tiled in the IGs output. Alternatively, the means for providing a plurality of component images may be a plurality of IGs each providing one or more component images. Alternatively, the means for providing a plurality of component images may be an array of video cameras. In this case the frustum and clipping planes are defined by the imager and optics of the cameras. The means for providing a plurality of component images may be adapted to provide component images in the form of column subsections of the image to be displayed. Synchronisation means for synchronising the provision of the component images may advantageously be provided for reasons of low latency and/or high quality imagery with no tearing at the overlaps between component images emanating from different sources.

A display processing system in accordance with embodiments of the present invention may furthermore comprise an imaging means for receiving the combined image data and producing an image. This way, a display system may be formed. The display system may be for projection, for direct view or for other display types.

The imaging means may be part of a projection device. The projection device may comprise a light source for generating a beam of light, the imaging means comprising a spatial light modulator for modulating the beam of light from the light source in accordance with the combined image data, for projection.

The imaging means may be adapted for producing an image having an imaging resolution, wherein the means for providing the plurality of component images is adapted to provide component images of a resolution so that the combined resolution of the combined image data of the component images has a resolution that is larger than the imaging resolution. This has the advantage of having a higher usable resolution image following the warping and other resampling processes. This is analogous to a cd player oversampling his audio stream so that its reconstruction filter can be simpler with a less aggressive fall-off characteristic while still avoiding aliasing effects. The video inputs may e.g. be at a resolution much higher than the panel resolution. For example, the panel may be 2048×1536 (3 Mpixel) but the video input may be two sources of 1168×1753 (2 Mpixel).

A display processing system according to embodiments of the present invention may be adapted for accepting component image data from multiple video sources and combining these sources to form a complete image.

In a display processing system according to embodiments of the present invention, one of the clipping planes may be at an angle with respect to the imaging means, e.g. a spatial light modulator.

In a second aspect, the present invention provides a method for processing image data, comprising:

receiving a plurality of component images, each component image being a portion of the complete image to be displayed, the image data of each component image being defined by an view frustum having a clipping plane, wherein at least two clipping planes of the view frustums are non-coplanar, and combining the image data of the component images.

By image data being defined by a view frustum is meant the processing of all image data in order to distinguish objects lying outside the view frustum from objects lying inside the view frustum.

The method may furthermore comprise imaging the combined image data, thus producing an image.

A method according to embodiments of the present invention may furthermore comprise a first warping of the image data before combining it. This first warping takes into account the non-planar clipping planes design, i.e. the non-coplanar clipping plane definitions. According to an embodiment of the present invention, the first warping may furthermore take into account aberrations introduced by the imaging means. Alternatively, a second warping may be provided, still before combining the image data, the second warping being a global system warping performed on each of the component images' data and taking into account aberrations introduced by the imaging means. According to still an alternative embodiment, the method may comprise, on top of the first warping before combination of the image data, a second warping of the image data after combining, this second warping taking into account aberrations introduced by the imaging means.

Providing a plurality of component images may comprise providing column subsections of the image to be displayed. Alternatively, providing a plurality of component images may comprise providing quadrant subsections of the image to be displayed.

Embodiments of the present invention may have as an additional advantage that the processing latency for non-linear image mapping (NLIM) or warping may also be reduced, particularly in the case of display panels that are addressed as one large continuous scan. The invention may use a plurality of independent non-linear image mapping processors or warp processors designed to operate with independent adjustment parameters along with a combiner circuit to combine the independently warped images into one continuous image.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1 illustrates what happens in a conventional projection system imaging coplanar clipping planes. In particular it illustrates pixel size variations center to edge in a conventional coplanar clipping plane design.

FIG. 2 illustrates the planes which make up the definition of a view frustum.

FIG. 3 shows a side view of a representation of a desired field of view in an image generator and its clipping plane, according to the prior art.

FIG. 4 shows a front view of the representation of FIG. 3.

FIG. 5 shows an oblique view of the representation of FIG. 3.

FIG. 6 shows a top view of the representation of FIG. 3.

FIG. 11 illustrates a single clipping plane image on a fixed matrix projector modulator panel in accordance with prior art.

FIG. 12 illustrates warp required for a single half of the dual split frustum design in accordance with embodiments of the present invention, and as illustrated in FIGS. 7*a* and 8*a*.

Figure 7A:
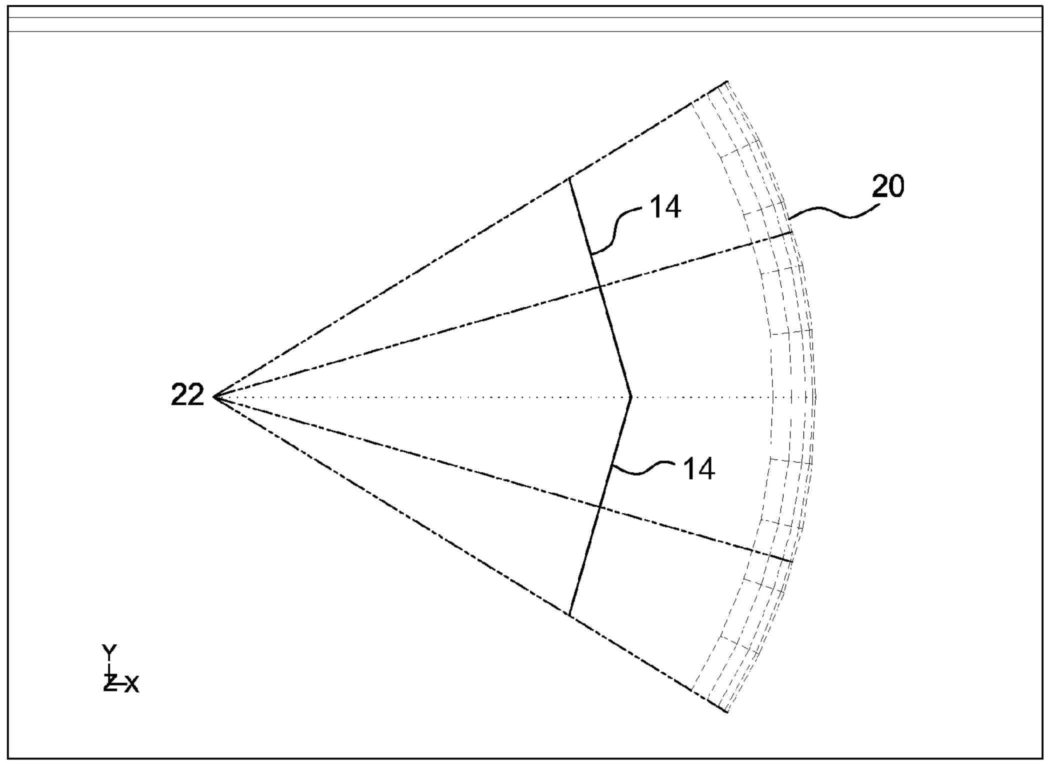
FIG. 7*a* shows a top view of a representation of a split frustum (dual frustum split) with non-coplanar clipping planes in accordance with embodiments of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims. The present invention will be explained in detail with reference to display systems, more particularly with reference to projection systems and images generated, e.g. rendered for such projection systems, however, the invention is not limited thereto. The present invention also includes direct view display systems, like CRT or LCD devices, and to image processing apparatus such as standalone warping video processors that produce no image directly and instead produce one or more video outputs of the final image rather than displaying it. These outputs may be segmented any of a number of ways including tiles, columns, rows, etc. Nevertheless, the present invention is specifically useful in projection systems for the simulation and visualisation markets where ultra-high pixel counts, large fields of view and high angular resolutions are desired. Of particular note is the current transition to 8 and 10 mega pixel projectors, where the technology presented hereinafter will be particularly helpful.

A process for generating images to be displayed, such as a rendering process, e.g. performed in an image generator, consists of the application of a series of co-ordinate transformations that takes an object database, i.e. a number of objects to be displayed e.g. by rendering, through a series of co-ordinate systems, as disclosed in more detail, for example, in the book "Advanced Animation and Rendering Techniques, Theory and Practice", by Alan Watt and Mark Watt, ed. ACM Press, ISBN 0-201-54412-1, 1992, the content of which is incorporated by reference in the present document.

When generating computer images, once an object has been modelled and has been given a local co-ordinate system, it has to be placed in a scene that is to be displayed, e.g. rendered. The global co-ordinate system of the scene is also known as the 'world co-ordinate system'. The local co-ordinates of all the objects in the scene have to be transformed into this global co-ordinate system in order that their relative spatial relationships may be defined. The act of placing an object in a scene defines a first transformation required to take the object from the local space to the world space.

The camera co-ordinate system is a space used to establish viewing parameters and a view volume. A virtual camera is often used as a conceptual aid in computer graphics. The virtual camera can be positioned anywhere in world space and point in any direction. A second transformation transforms co-ordinates of the objects from the world space to the camera space. The camera space is the most convenient space in which to cull polygons. The culling operation removes entire polygons that are invisible for a viewer.

Determining whether a polygon is visible from a view point involves a simple geometric test. The geometric normal to the polygon is calculated and the angle between this and the line-of-sight vector is determined. The line-of-sight vector is the vector from the polygon to the view point. If this angle is greater than 90° then the complete polygon is invisible to the viewer and the database comprising the objects in the scene is tagged accordingly. Objects invisible to the viewer are not further considered during image generation.

The final space into which the data is transformed is the image space. It is the process that describes the method of viewing the scene and is concerned with projective geometry, or how to define those light rays that reach the virtual camera. The fundamental transformation that transforms the data into image space is the perspective transformation, which takes a point in the scene and projects it onto a view port positioned at a distance D away from the virtual camera and oriented normal to the viewing direction.

Image space is defined to act within a closed volume in the camera space, called the imaging frustum or view frustum 10, that delineates the volume of camera space which is to be displayed, e.g. rendered, as illustrated in FIG. 2. As is generally known, the view frustum 10 is used to define viewable objects for presentation. Objects that lie outside the view frustum 10 are not to be displayed, e.g. rendered. Thus, from virtual camera 22 a pyramid is defined. The view frustum 10 is bounded by the four sides of the pyramid having an apex at virtual camera 22. The view volume or view frustum 10 can be specified as follows: suppose we have a square window, the view port, of size $2h$, arranged symmetrically about the viewing direction. The four planes 12 defined by:

$$x_e = \pm\frac{hz_e}{D}$$

$$y_e = \pm\frac{hz_e}{D}$$

together with the two additional planes, called the near clipping plane 14 (coinciding with the view port) and the far clipping plane 16 respectively, perpendicular to the viewing direction $z_e$, defined by:

$z_e=D$ $z_e=F$ make up the definition of the view frustum 10 as shown in FIG. 2. The view frustum 10 may thus be thought of as a truncated pyramid where the near clipping plane 14 clips the pyramid defined from a virtual camera 22 at a front end, i.e. closer to the virtual camera 22. Far clipping plane 16 clips the pyramid at a far end. The visible volume for display through a view port is defined within the truncated pyramid volume of view frustum 10. One skilled in the art will appreciate that the view frustum 10 enables objects defined in world space to be culled in order to present only the visible objects on a two-dimensional view port. Consequently, near clipping plane 14 may be considered a virtual display surface, i.e. a view port, in which objects defined within view frustum 10 are presented.

The bulk of the computation involved in processing, e.g. rendering an image takes place in image space. In image space, polygons are clipped against scan lines and pixels, and hidden surface calculations are performed on these clipped fragments.

A representation of a desired field of view (FOV) 20 in an image generator and its frustum 10 with near clipping plane 14 are shown in FIG. 3. In this figure, the grid 20 e.g. represents a 70 degree horizontal by 43 degree vertical FOV shown as an appropriately truncated portion of a sphere which is projected onto a curved projection surface or view port as is desired in simulator design. The vertical line representing the near clipping plane 14 is an end on view of the view port. The slanted lines representing the side planes 12 of the view frustum 10 originate at the virtual camera 22. These slanted lines are shown for reference only, to illustrate the borders of the view frustum 10.

The same image but seen from the virtual camera 22 looking directly forward is shown in FIG. 4, i.e. the image from FIG. 3 is rotated around a vertical axis by 90 degrees. FIG. 4 shows, by means of the dotted grid, the desired FOV 20, by means of the dashed grid the image 24 on the near clipping plane 14 which, after displaying e.g. projection corresponds with the image on the desired FOV 20, and by means of the full line grid the image 26 generated by the image generator. The grids 24 and 26 are in the same plane, i.e. the image generator view port, which is the near clipping plane 14 of the view frustum 10. The line representing the near clipping plane in FIG. 3 is thus now revealed to comprise a grid 24. The full line grid 26 illustrates the extent of the raster image that will be produced by the image generator. In fact, this grid 26 may be thought of as being composed of lines and pixels. The grid 24 forms a grid of exactly the desired FOV 20 (70 H×43V) when imaged, e.g. projected, onto the display surface. Here it is apparent that the desired FOV 20 is not square when mapped to the near clipping plane 14 of the view frustum 10. The portions of the grid 26 that are not also contained in the grid 24 represent areas (and therefore pixels) that are generated, e.g. rendered by the image generator (IG) but are not used by the system as they extend outside the desired FOV 20. They are further called wasted pixels. As the field of view is increased, the degree of waste increases.

The grid 26 on the near clipping plane 14 of the frustum 10, is, in the example illustrated, equally bisected in 10×8 squares. Each square has an equal number of lines and pixels. The number of each is not important for the discussion, only that they are all equal. Similarly, the grid 24, the angular FOV or thus the image corresponding to the desired FOV 20 after imaging, is also bisected equally into a 10×8 grid of squares. It is to be noted when looking at the grids 24 and 26 that in some areas the grids are exactly superimposed. If one examines the relative sizes of the overlapping squares in the grids 24 and 26 in different areas, it becomes apparent that the squares of grid 26 are larger than the squares of grid 24 in the center of the grids, and the squares of grid 24 are larger in than the squares of grid 26 at the edges and in corners. As the pixel and angular extents of each square are respectively constant (each square having an equal number of lines and pixels), these size variations illustrate that in conventional systems the angular extent of a pixel varies throughout the FOV and is much larger in the center compared to the edges.

This holds for conventional symmetric clipping planes; non-symmetric clipping planes exhibit a similar behaviour except that the area of least resolution will not be the center of the generated image. Such inhomogeneous resolution distribution worsens as the angular extent of the field of view increases, as can be expected in applications using ultra-high resolution displays.

An oblique view of the representation of FIG. 3 is shown in FIG. 5 to give a better sense of how this all fits together and why for a constant vertical angle, a curve is formed when the desired FOV 20 is mapped to the near clipping plane 14. Mathematically this occurs because the distance to the viewing surface from the virtual camera 22 varies with the horizontal angle H angle as a function of (1/cos(H angle)).

A top view of this conventional system is shown in FIG. 6.

FIG. 1 illustrates what happens in such conventional projection system. Two image generators each generate an image with co-planar clipping planes of their view frustums 10 (not illustrated in FIG. 1). These images together are combined on a large multi-image panel of a projector into one large image to work with. In this situation of images with co-planar clipping planes, the warp requirements for the clipping planes are such that the IG images could be combined using a simple pixel inlay and scaling as in a conventional PIP system. Although conceptually simple and easy to combine, such an arrangement does not improve the resolution distribution. It has been found by the inventor of the present invention that a flat clipping plane, i.e. a plurality of view frustums having coplanar near clipping planes 14, is inefficient for larger angular fields of view.

Figure 7B:
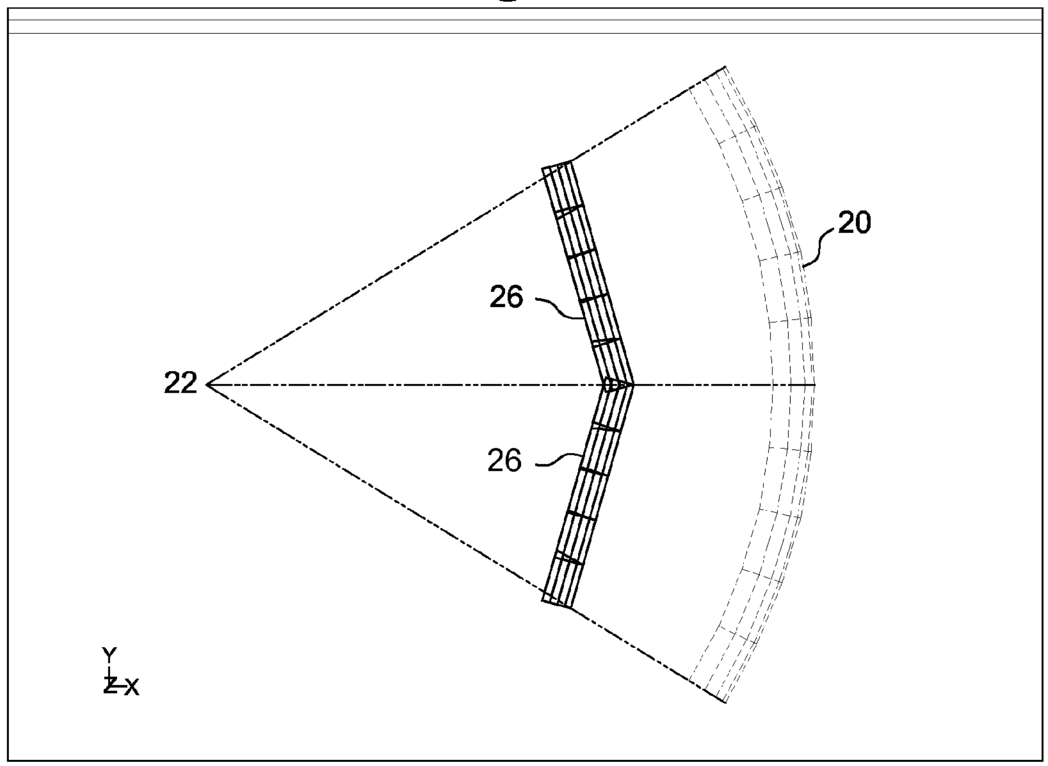
FIG. 7*b* shows a top view of a representation of a split frustum (4 frustum split) with non-coplanar clipping planes in accordance with embodiments of the present invention.
Figure 8A:
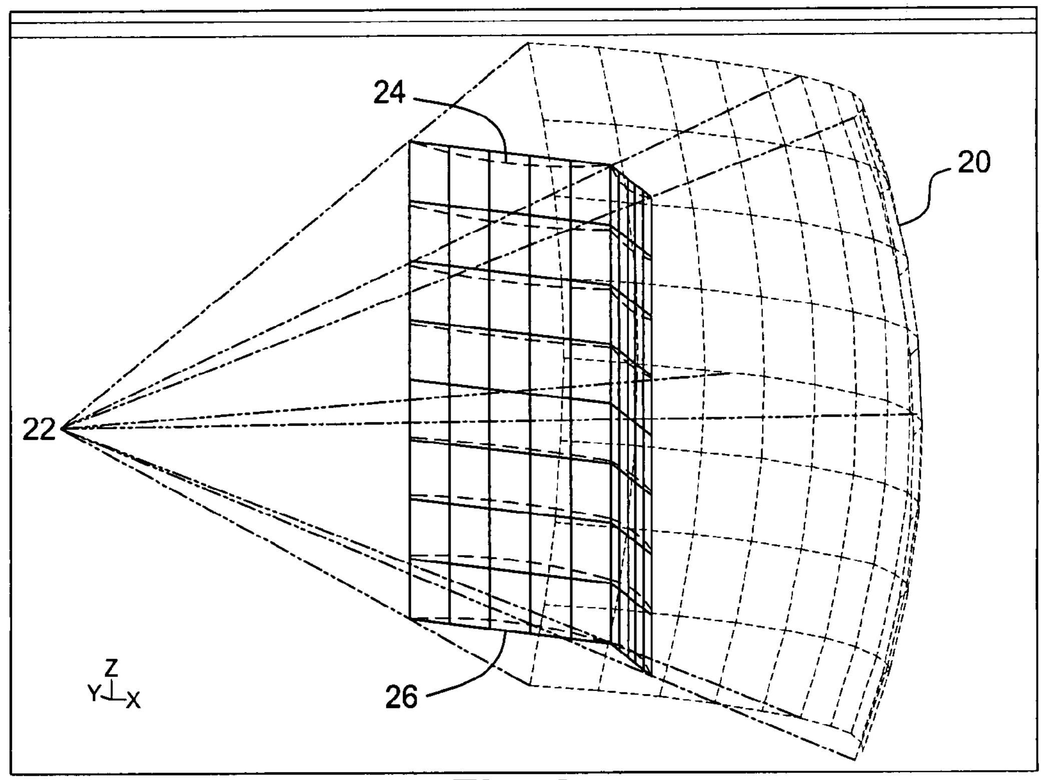
FIG. 8*a* shows an oblique view of the representation of FIG. 7*a*.
Figure 8B:
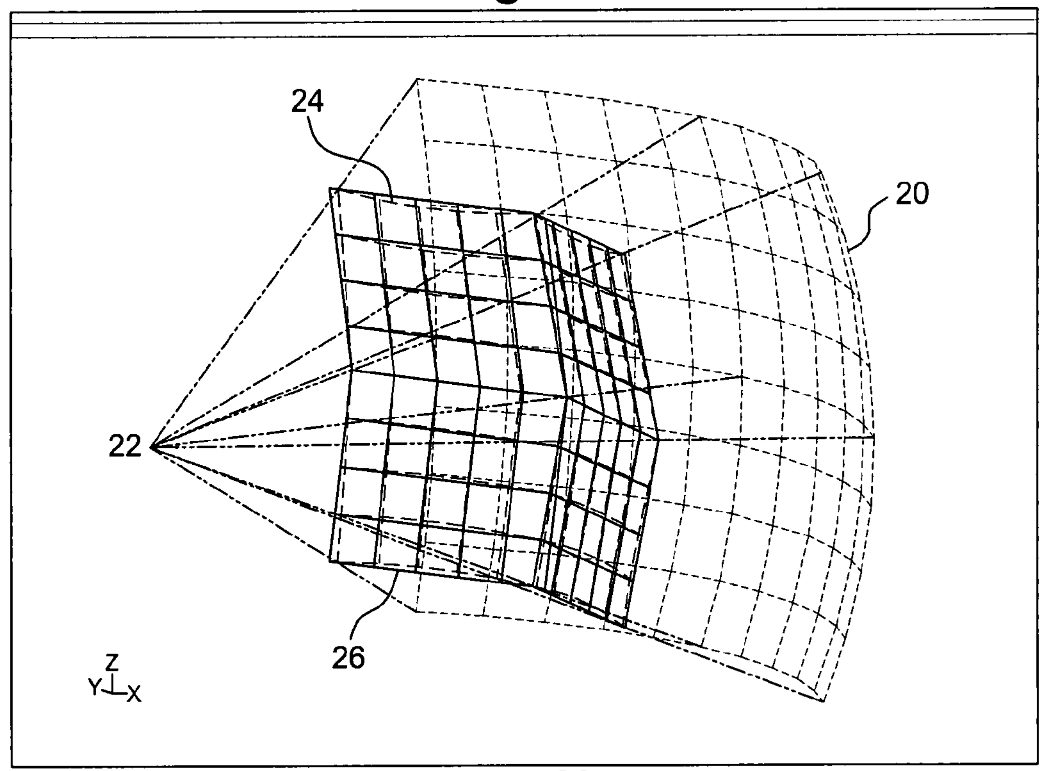
FIG. 8*b* shows an oblique view of the representation of FIG. 7*b*.

With all the above concepts understood, the next step is taken, in accordance with the present invention, of splitting images corresponding to the desired FOV 20, e.g. the 70 H×43V FOV, into at least two collocated, non-coplanar clipping planes of frustums with a combined FOV equal to the originally desired FOV 20. A top view of a split frustum design where the frustum is split into two frustums with non-coplanar near clipping planes 14 is shown in FIG. 7*a*, and an oblique view is shown in FIG. 8*a*. As another embodiment, a top view of a split frustum design where the frustum is split into four frustums with non-coplanar near clipping planes 14 is shown in FIG. 7*b*, and an oblique view is shown in FIG. 8*b*. The dashed grids 24 represent images on the near clipping planes 14 corresponding with the images ultimately provided onto the display surface, and the full line grids 26 represent the images generated by the image generators. The above examples are illustrations only, and are not intended to limit the present invention in any way. The present invention covers split frustum designs where the view frustum is split into any plurality of view frustums wherein at least two near clipping planes of two of such frustums are non-coplanar. The view frustum may be split along any number of angles and in multiple planes. For optimal advantage the split frustums should preferably be the smallest symmetrical frustums that fully enclose the component field of view resulting from the split.

Figure 9:
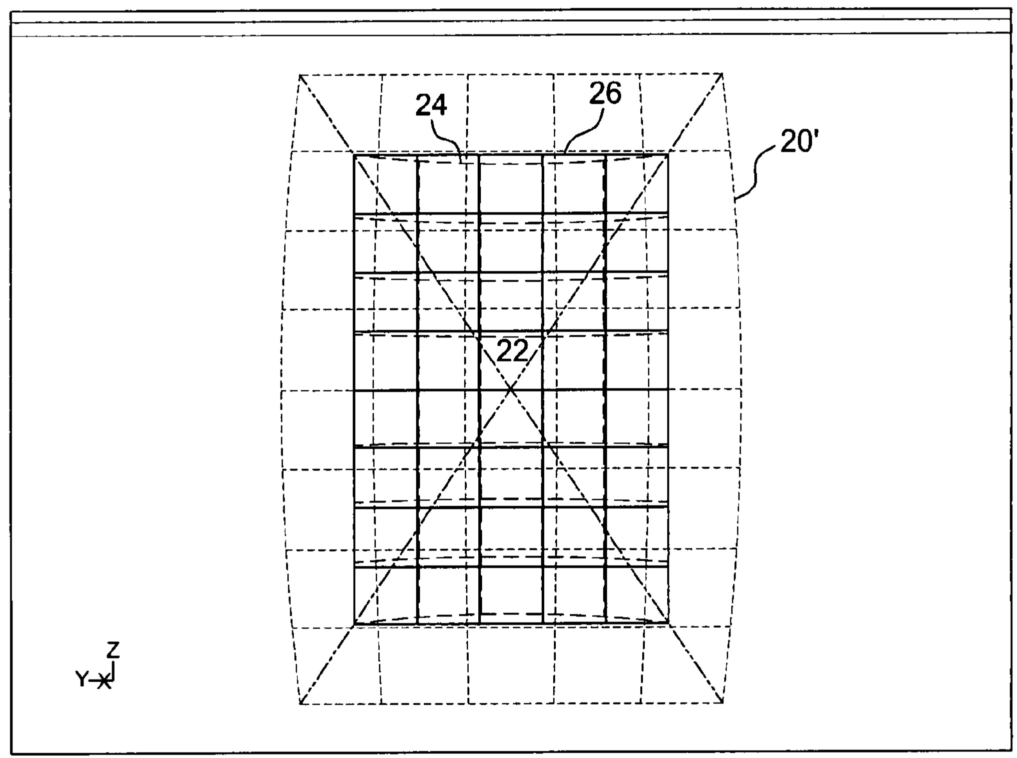
FIG. 9 shows a single clipping plane of the dual frustum split represented in FIG. 7*a* or 8*a*.

With the split frustum design as illustrated in FIG. 7*a* and FIG. 8*a*, a single clipping plane of the two is examined looking directly towards the center of the partial clipping plane. This is illustrated in FIG. 9. When comparing the area of the grid 26 that is not part of the grid 24 in FIG. 9 and the corresponding area of the single frustum design illustrated in FIG. 4 (the desired image content in a clipping plane being a subset of the image content in the total clipping plane), then it can be seen that this area is clearly smaller in the two non-coplanar clipping planes solution in accordance with an embodiment of the present invention. Numerically, the conventional coplanar clipping plane solution uses 90.4% of its total pixels, the split frustum or non-coplanar clipping plane solution of FIGS. 7*a* and 8*a* uses 97.5% of its pixels, which illustrates an improvement in pixel utilization of 7.1%, and thus 7.1% fewer wasted pixels. It is to be noted that the relative sizes of the squares in the grid 24 and the squares in the grid 26 are approximately the same, regardless of the location examined. This means that the angular pixel size is relatively constant throughout the entire FOV. Although not explicitly illustrated in the drawings, similar results are found for the split frustum design with four frustums and for any other split frustum design in accordance with embodiments of the present invention.

Figure 10:
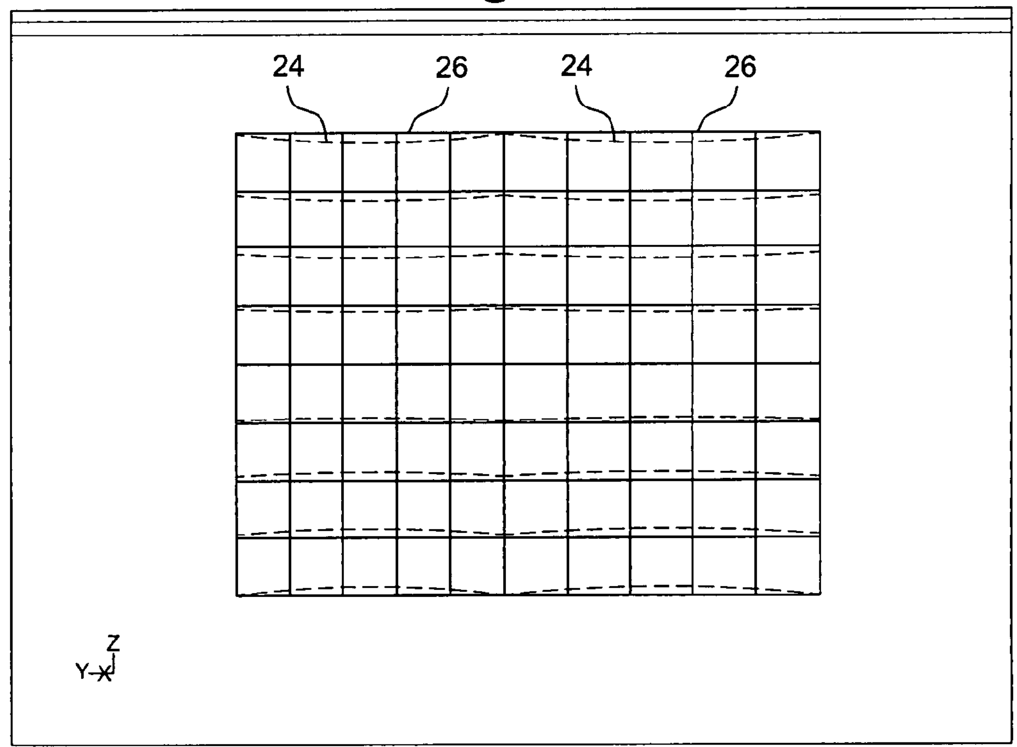
FIG. 10 illustrates simple combination by edge to edge placement of two images of dual split frustums with non-coplanar clipping planes.

The question now arises on how to combine the images generated or obtained in the split frustum design in accordance with embodiments of the present invention. One can see from FIG. 10 that, in case of the split frustum design illustrated in FIG. 7*a* and 8*a*, if the two grids 26 from the split frustum design, i.e. e.g. the images generated by the image generators, would be placed edge to edge, the grids 24 would not produce smoothly arcing lines; instead discontinuous peaks would be formed, which would be visible in the image ultimately provided onto the imaging surface. This means that a simple PIP like linear scaling and translation will not produce a correct image in case of the non-coplanar view frustum design in accordance with the present invention. The same holds for other split frustum designs in accordance with embodiments of the present invention.

The individual images therefore must be individually warped. The warping process may be implemented in at least two ways: 1) warp and combine the plurality of images into a single continuous image and then warp the combined image into the correct geometry for the optical system, or 2) warp each image to its final shape independently and then combine them on the imaging means, e.g. panel.

A refinement of this embodiment of the invention is to use the clipping plane definitions from each image source in order to simplify the adjustment of the display system. In method 1 above, i.e. when first warping, combining and then warping the combined image, it is possible to use the clipping plane definitions to automatically set the warping and combining parameters to form the single continuous image. Similarly, it is also possible to use the clipping plane definitions along with controls for the desired system geometry to automatically generate the individual warp parameters as required in method 2 above, i.e. first warping each image independently and then combining the warped images. Such automation has the advantage of reducing the time and effort required to align display systems using this invention.

It is to be noted that the discussion so far has nothing to do with the display used, if any, or with the optical system of the simulator. It is strictly related to the numerical geometric method used inside image generators (IGs) and graphic processing units (GPUs) to calculate and provide images.

Next, differences in warping requirements to achieve a correct image as seen from the system design eye point are examined. The system design eye point is not the virtual camera 22. The system design eye point is the location from which the image will be observed by a viewer, e.g. in a simulator. It may include any number and combination of optical devices between the observer and the projector. The contribution of all these components to the final shape of the image must be understood. In the simple model now discussed, the projector uses a simple lens to project directly onto a spherical surface located directly in front of the observer. However, this is not intended to be limiting for the invention; the invention may include far more sophisticated optical devices or components, the contribution of which, or an approximation thereof, to the image forming should then preferably also be taken into account.

In FIG. 11 the rectangle 33 at the extremes of the image represent the limits of a fixed matrix projector modulator panel (e.g. LCD, DLP, LCOS). The grid 35 is the warped raster grid which is the equivalent of the full line grids 26 in the previous illustrations, representing the image generated by the IG as provided to the modulator panel, taking into account the contribution of the optics. The dashed grid 37 is the warped desired FOV grid 20 equivalent to the grids 24 in the previous illustrations, but as provided to the modulator panel, taking into account the contribution of the optics. To determine the needs of the warping system, one must only consider the shape of the full line grid 35. FIG. 11 shows a conventional single clipping plane IG design.

FIG. 12 shows the warp required for a single half of the split frustum design in accordance with an embodiment of the present invention as illustrated in FIG. 7*a* and FIG. 8*a*.

Figure 13A:
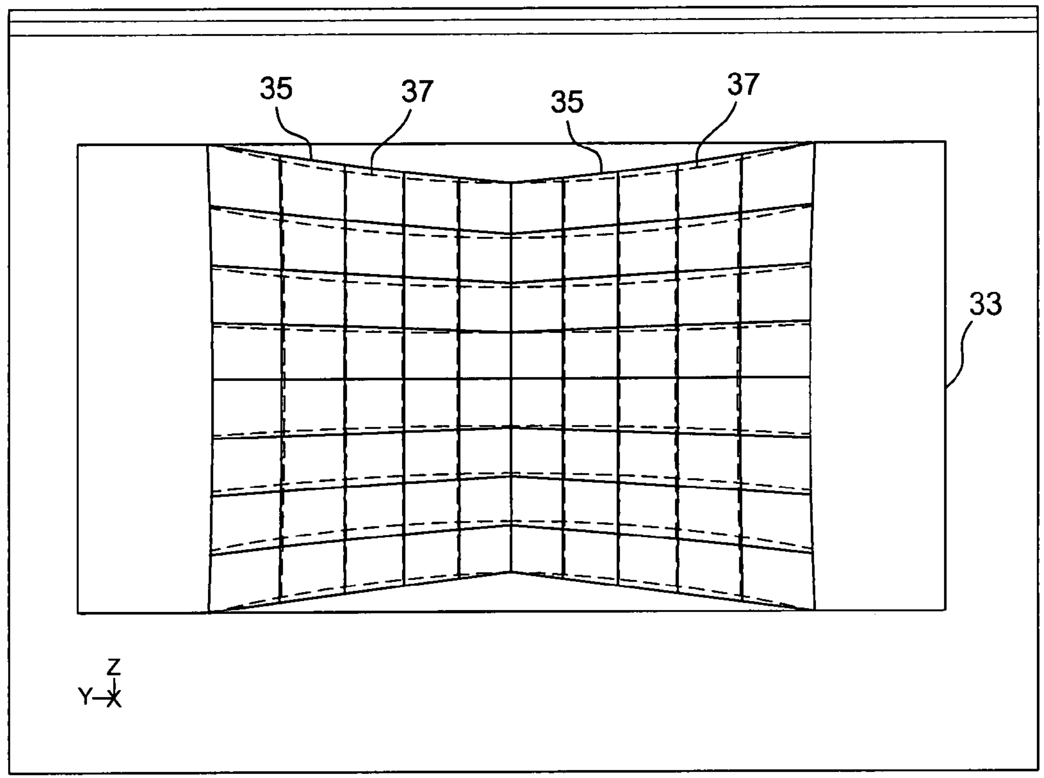
FIG. 13*a* illustrates warp required for both halves of the dual frustum split design in accordance with embodiments of the present invention as illustrated in FIG. 7*a* and FIG. 8*a*.
Figure 13B:
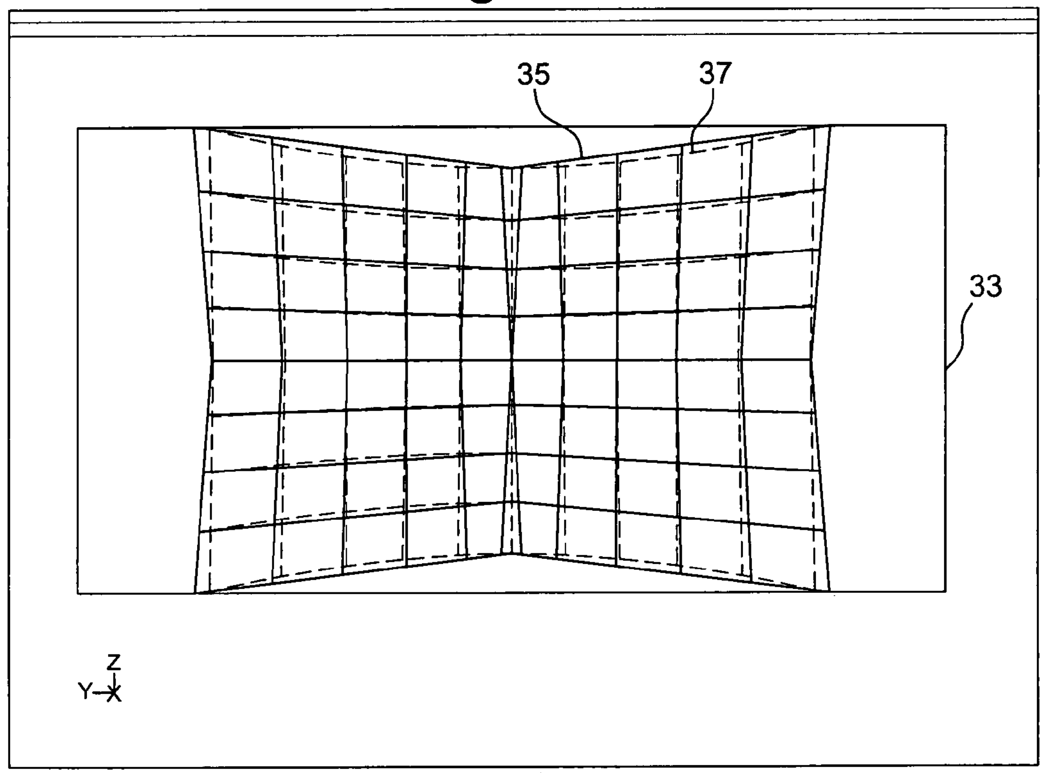
FIG. 13*b* illustrates warp required for all parts of a four frustum split design in accordance with embodiments of the present invention as illustrated in FIG. 7*b* and FIG. 8*b*.

FIG. 13*a* shows both halves of the split frustum design in accordance with embodiments of the present invention as illustrated in FIG. 7*a* and FIG. 8*a*, correctly warped onto the projector's panel 33. Similarly, FIG. 13*b* shows the four quadrants of the split frustum design in accordance with embodiments of the present invention as illustrated in FIG. 7*b* and FIG. 8*b*, correctly warped onto the projector's panel 33. It may be surprising at first to realize that the location of the grids 37 are identical between the single frustum and split frustum (compare FIG. 11 with FIG. 13*a* and FIG. 13*b*). Upon reflection, one realizes that the optical system from the panel to the observer is invariant to the clipping plane used in the IG and the mapping from observer to panel must therefore remain constant. What does change is the warping required of the raster grid to achieve the result of correctly placed, identical FOV grids (grids 37). This effect can be seen when carefully examining the location of the grids 35 between the two illustrations of FIG. 11 and FIGS. 13*a* and 13*b* respectively.

In an aspect, the present invention provides a display processing system 50 for providing video signals for displaying an image, in particular for example, but not limited thereto, a wide field-of-view image. Such display processing system 50 is illustrated schematically in FIG. 14.

A display processing system 50 according to embodiments of the present invention comprises input channels 68 for receiving a plurality of component images 52, each component image 52 being a portion of a complete image for display.

The image data of each component image 52 is defined by a view frustum having a clipping plane. In accordance with the present invention, at least two clipping planes of two of the view frustums are non-coplanar, i.e. they are not aligned such that their 2D windows are planar and thus exist in a common plane. By image data being defined by a view frustum is meant the processing of all image data in order to distinguish objects lying outside the view frustum from objects lying inside the view frustum.

The display processing system 50 further comprises a combiner 56 for combining the image data of the component images 52 into image data for the combined image.

According to embodiments of the present invention, a plurality of view frustums, also referred to as viewing planes, are used to define multiple images to be processed and displayed by one projector.

In embodiments of the present invention, the display processing system 50 may be provided with a means for providing a plurality of component images 52, e.g. one or more image generators 54, outputting the component images 52 to the input channels 68 of the display processing system 50. In case there is only one image generator 54, this single IG would generate, e.g. render a number of images, each of these images representing a component image 52, each with its own view frustum of which at least two have non-coplanar clipping planes. The images can be sequentially generated, or they can be tiled in the output of the IG. Alternatively, the means for providing a plurality of component images 52 could be an array of video cameras. In case of the means for providing a plurality of component images 52 being an image generator 54, the frustum and clipping plane are defined and applied to the image generator 54. In case of the means for providing a plurality of component images 52 being an array of cameras, the frustum and clipping plane are defined by the imager and the optics of the camera.

The display processing system 50 may be implemented in a display system furthermore comprises an imaging means 58, such as e.g. a spatial light modulator and further optics of a projection device, e.g. an LCD panel, or an imaging means of a direct view display, for receiving the combined image data and producing an image. In case of the imaging means comprising a spatial light modulator, it receives the combined image data, and modulates a beam of light from a light source in accordance with this image data, for projection. Conventional optics may be used. However, dedicated equipment, such as lenses optimised for projecting on spherical surfaces, may also be used. Lenses with optimised mappings such as F/Tan(Theta) or F/Theta may also be used to further enhance system resolution by better matching panel resolution to the angular resolution as seen by the observer through the intervening optical system. The optical systems used may be specially designed and dedicated to the applications they are used for.

Furthermore, the combiner 56 of a display processing system 50 in accordance with embodiments of the present invention may comprise warping means 60 for providing desired or required shaping to the individual images generated by the image generators 54, in order to obtain image data corrected for the fact that a single large FOV clipping plane is split into a plurality of clipping planes of which at least two are non-coplanar. As an alternative embodiment, not illustrated in the drawings, it is possible to have a single warping means 60 for providing desired shaping to one of the individual images generated by the image generators 54, for warping it so as to entirely match the other(s).

Furthermore, a display processing system 50 in accordance with embodiments of the present invention may comprise further warping means 62 for pre-warping the image to be shown, in order to correct for deviations introduced by optics or elements in the optical path of the image. The warping means 62 corrects the image geometry so that it appears correct to equipment users, e.g. to simulator users.

The images warped as such, i.e. with a first pre-warping to take into account the fact of having images generated with at least two non-coplanar clipping planes, and optionally also warped to pre-correct for deviations introduced by optics or elements in the optical path of the image, are then ready for being displayed, i.e. for being shown on a display surface, e.g. screen, for direct view, or for being projected thereon.

Figure 14:
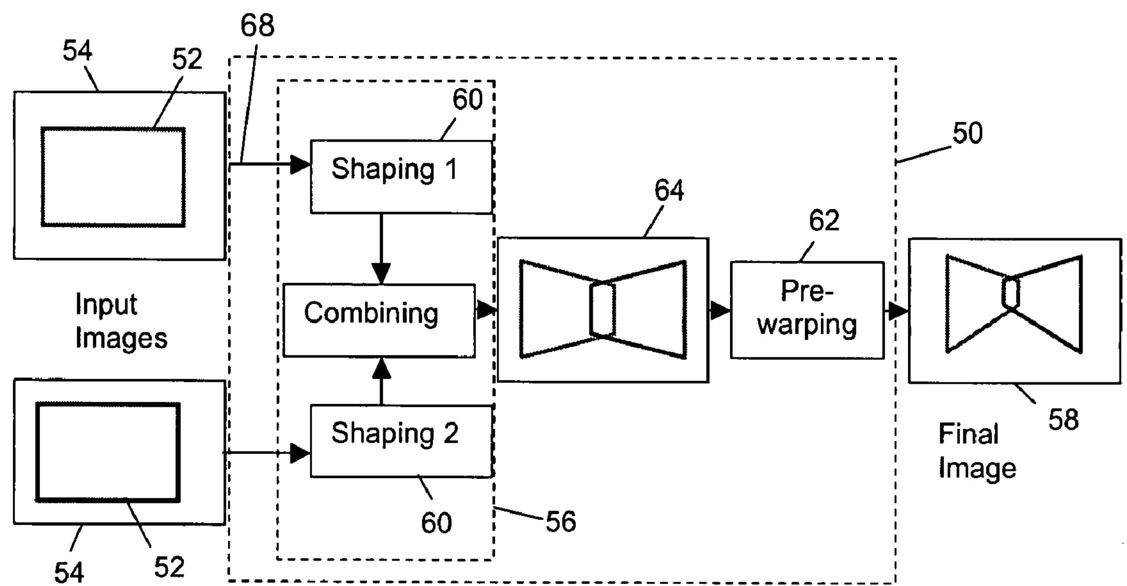
FIG. 14 schematically illustrates a display system according to an embodiment of the present invention.

In the embodiment illustrated in FIG. 14, each independent image is shaped to map it to a single image plane 64. The resulting composite image is then shaped in the further warping means 62 to comply with the needs of the optical requirements of the system 50 so that the image eventually displayed is geometrically correct to an observer. Such shaping may include compensating for geometrical distortions, e.g. whether or not the projected straight lines exhibit a degree of curvature ('bow' or 'pin') and whether or not lines which should be horizontal or vertical on the display surface have a degree of slope ('skew' or 'key'). Careful attention is required to ensure sufficient pixel resolution in the intermediate images, i.e. at the level of the image plane 64, in order to minimise resolution loss. It is not necessary or particularly desirable that the inputs or intermediate images have the same pixel resolution as the imaging means, e.g. the light modulator.

Figure 15:
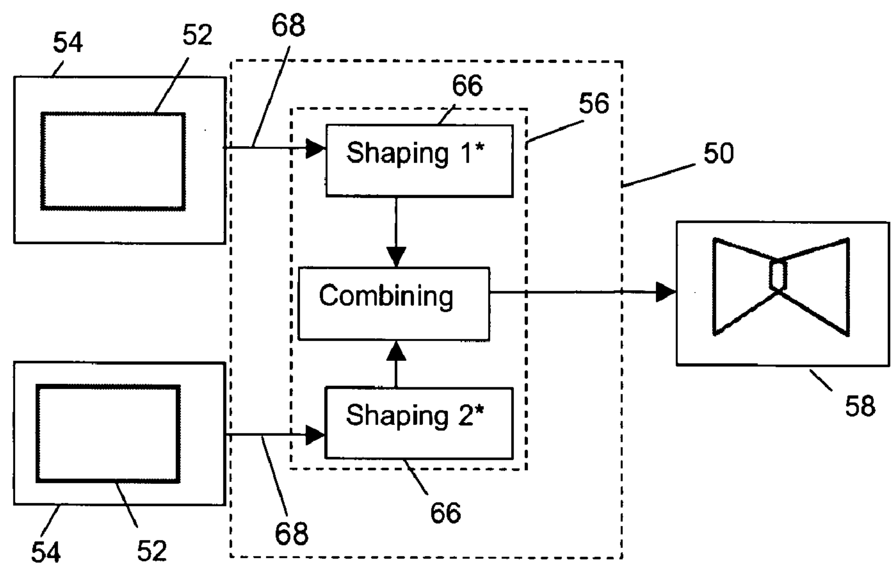
FIG. 15 schematically illustrates a display system according to another embodiment of the present invention.

According to another embodiment, as illustrated in FIG. 15, the shaping or pre-warping to the image plane 64 and the shaping or pre-warping for optical requirements of the system may be combined into an improved warping means 66. This way, the complexity of the shape processing or pre-warping can be greatly reduced.

According to still another embodiment, not illustrated in the drawings, an intermediate embodiment may be provided, in which before combining the component image data a first and a second warping are performed, the first warping accounting for the fact that the clipping planes of at least two frustums are non-coplanar, and the second warping taking into account the optical requirements of the system. If relative clipping plane definitions of each image source are provided to the warping means, the second warping may be a co-ordinated warping, so that a global warping action may be performed. This way aberrations introduced by the imaging means can be corrected by only one macro adjustment function, rather than by individual adjustments of the input images as suggested by the embodiment illustrated in FIG. 15. This functionality can be further extended to the embodiment illustrated in FIG. 15 via mathematical means combining the two warp functions of each component image thereby capturing the advantages of simplified adjustment and reduced hardware complexity.

By splitting a single large FOV clipping plane into two or more adjacent clipping planes of equivalent or nearly equivalent combined FOV, as in accordance with the present invention, the resolution homogeneity can be dramatically improved. However, such a solution requires that the display processing system 50 independently shapes these multiple images into a single coherent image for display. As indicated above, these shaping operations can be combined with other shaping operations that may be required for the display to produce a final image that is correct when observed.

Figure 16:
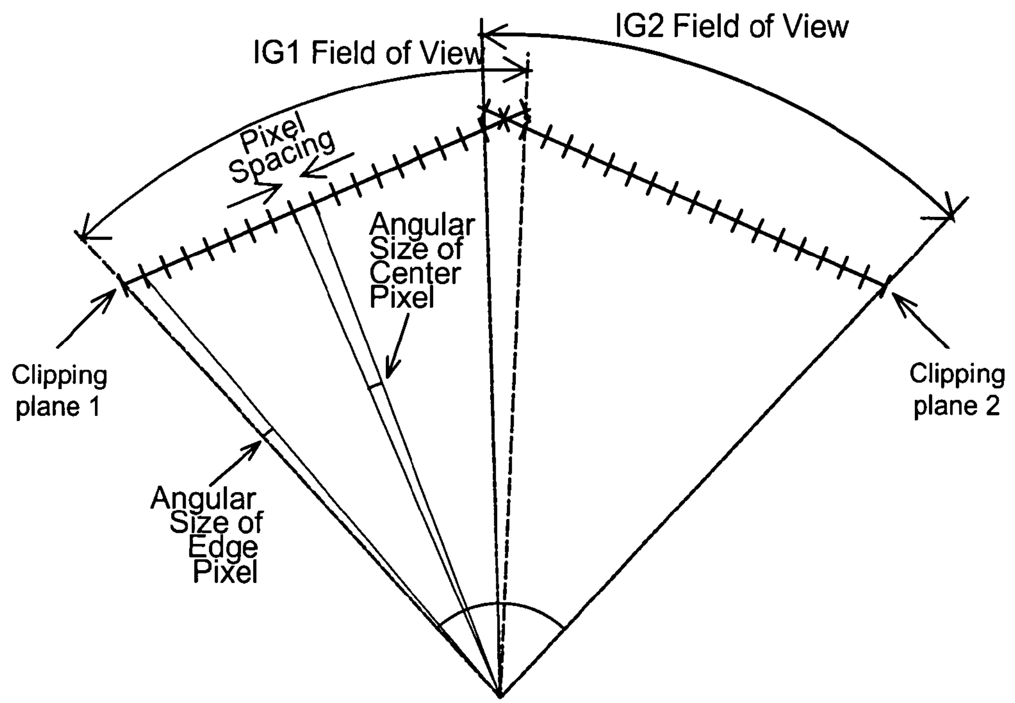
FIG. 16 illustrates pixel size variations center to edge in a non-coplanar split frustum design (dual split) in accordance with embodiments of the present invention

FIG. 1 shows a conventional IG clipping plane. The dark line is divided into e.g. 2048 equal length pixels. It is clear that the angle represented by the center pixel is larger than that of the edge pixel. This illustrates the concept of inhomogeneous angular resolution in conventional clipping planes. FIG. 16 shows non-coplanar IG clipping planes in accordance with embodiments of split frustum design of the present invention. The conventional IG clipping plane of FIG. 1 has been split into two adjacent and slightly overlapping clipping planes. It is clear from a comparison between FIG. 1 and FIG. 16 that the angular extent of the center and edge pixels are much better matched (homogeneity) in embodiments of display systems in accordance with the present invention and that the worst case size in embodiments of the present invention with non-coplanar clipping planes (FIG. 16) is smaller than in case of coplanar clipping planes (FIG. 1), even though the total number of pixels remains the same. Thus, in the example given (horizontal FOV 70 degrees, vertical FOV 43 degrees), for a same number of pixels, the resolution uniformity improves from 33% variation centre to edge in the prior art solution (FIG. 1) to only 9% centre to edge in the embodiment in accordance with the present invention (FIG. 16).

Figure 17A:
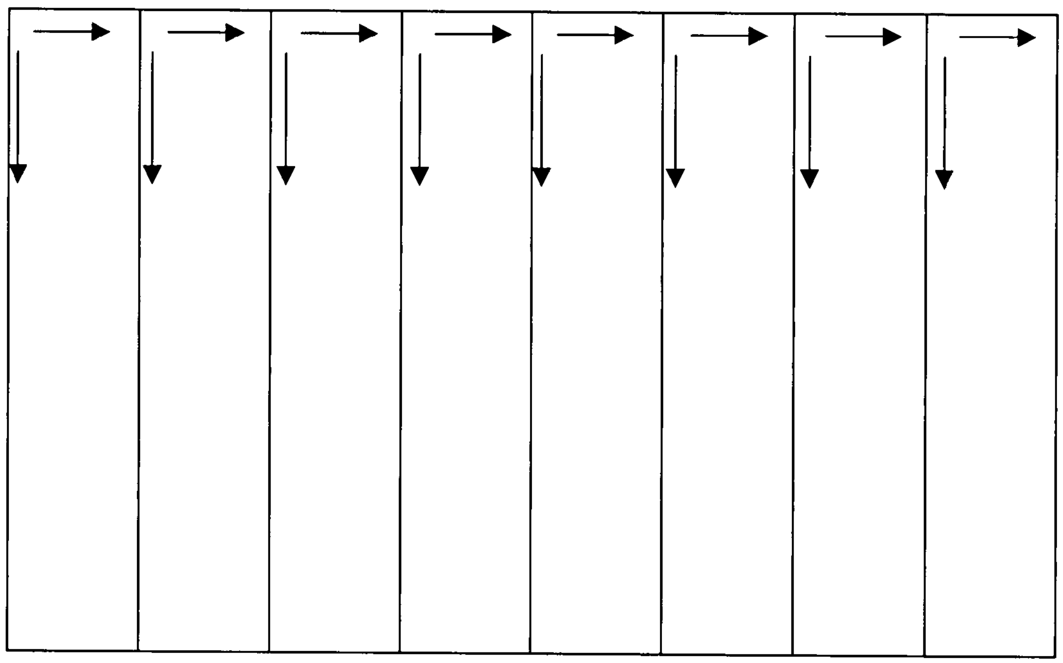
FIG. 17*a* illustrates column-wise driving of a display system, in accordance with embodiments of the present invention.

According to embodiments of the present invention, the means for providing a plurality of component images, e.g. the image generators 54, could provide component images which form rows, columns or tiles of the image to be displayed, the case of rows being illustrated in FIG. 17*a*. This way, multiple means for providing component images 52, e.g. image generators 54, may create in parallel their specific narrow strip, row or tile of the full pixel display using view frustum culling. For example, given a pixel display having the dimensions of 5120×4096 pixels, embodiments of the present invention could break up the pixel display area into a plurality of column subsections of equal size, e.g. 8 column subsections each having the dimensions of 640×4096 pixels. In this manner, the full pixel display is completely mapped. Preferably, means for synchronising the provision of the plurality of component images 52 are provided, in order to obtain low latency of the display system and/or high quality imagery with no image tearing at the overlaps between the images emanating from different image sources.

Figure 17B:
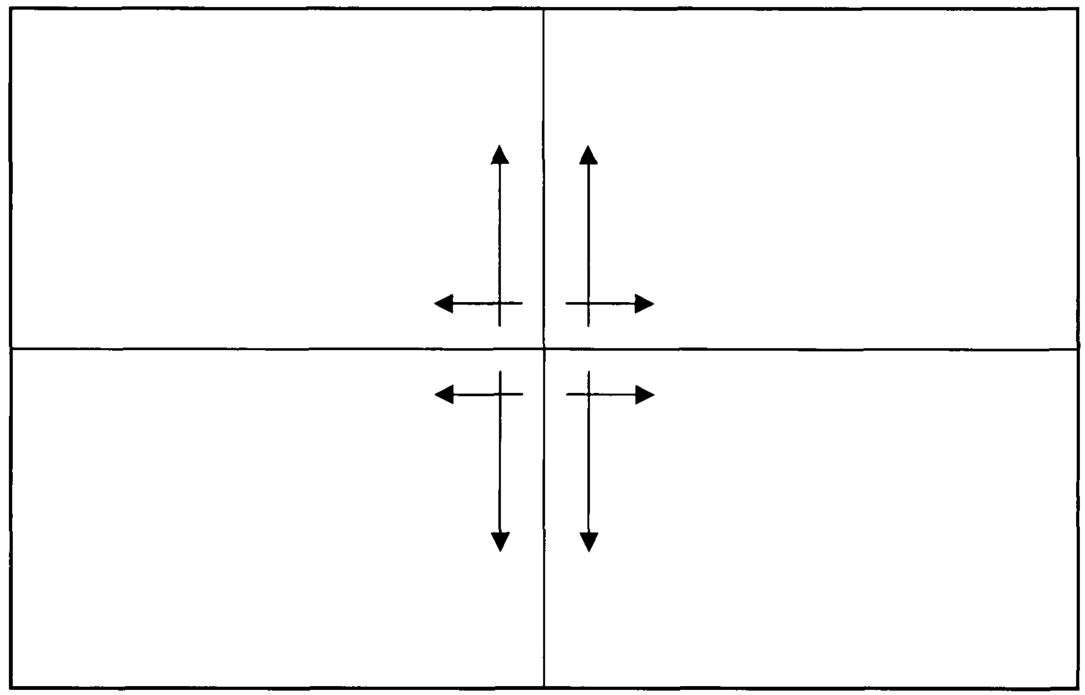
FIG. 17*b* illustrates quadrant-wise driving of a display system from the middle common boundary towards the edges, in accordance with embodiments of the present invention.

Also, according to embodiments of the present invention, the means for providing a plurality of component images 52, e.g. the image generators 54, could provide component images 52 which form quadrants of the image to be displayed, as illustrated in FIG. 17*b*. This way, multiple means for providing component images 52, e.g. image generators 54, may create in parallel their specific quadrant of the full pixel display using view frustum culling. For example, given a pixel display having the dimensions of 4096×2160 pixels, embodiments of the present invention could break up the pixel display area into a plurality of quadrant subsections of equal size, e.g. 4 quadrant subsections each having the dimensions of 2048×1080 pixels. In this manner, the full pixel display is completely mapped. Such a configuration, with the scan directions shown is ideally matched to quadrant addressed spatial light modulators such as the Sony SXRD LCoS panel. Preferably, means for synchronising the provision of the plurality of component images 52 are provided, in order to obtain low latency of the display system and/or high quality imagery with no image tearing at the overlaps between the images emanating from different image sources.

Figure 18:
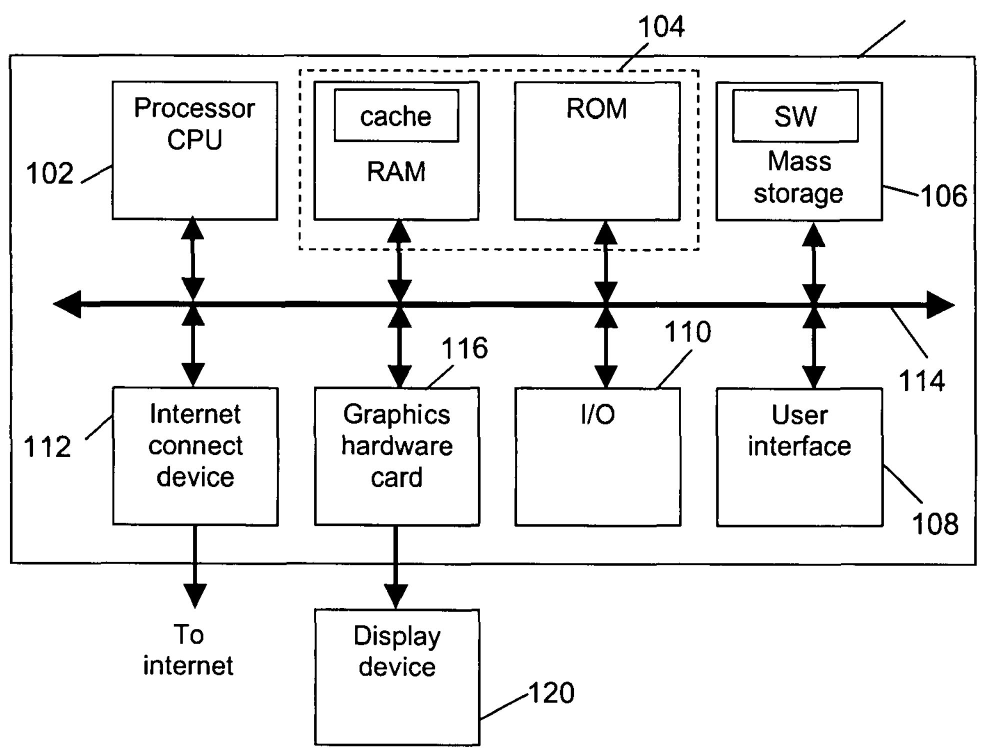
FIG. 18 is a block diagram of a computer system for use with embodiments of the present invention.

FIG. 18 is a block diagram of a computer system 100 which may be used in accordance with embodiments of the present invention. Within the discussions of embodiments of the present invention, certain processes and steps are discussed that are realised as a series of instructions (e.g. software program) that reside within computer readable memory units of computer system 100 and executed by processors of computer system 100.

In general, FIG. 18 shows one configuration of processing system 100 that includes at least one programmable processor 102 for processing information and instructions, coupled to a memory subsystem 104 that includes at least one form of memory, e.g., RAM, static RAM, dynamic RAM, ROM, and so forth, for storing information and instructions (e.g. graphics software). A storage subsystem 106 may be included that has at least one disk drive and/or CD-ROM drive and/or DVD drive for storing information and instructions. In some implementations, a display system, a keyboard, and a pointing device may be included as part of a user interface subsystem 108 to provide for a user to manually input information. Ports 110 for inputting and outputting data also may be included. More elements such as network connections 112, interfaces to various devices, and so forth, may be included, but are not necessarily illustrated in FIG. 18. The various elements of the processing system 100 may be coupled in various ways, including via a bus subsystem 114 shown in FIG. 18 for simplicity as a single bus, but will be understood to those in the art to include a system of at least one bus. The bus may be and address/data bus for communicating information. The memory of the memory subsystem 104 may at some time hold part or all of a set of instructions that when executed on the processing system 100 implement the step(s) of the method embodiments described herein. A display device 120, e.g. an ultra high resolution display device or a wide FOV display device, may be provided for displaying information. The display device 120 can be a liquid crystal device, a cathode ray tube, or any other display device suitable for creating graphics images and alphanumeric characters recognizable to a user. It may be a direct view display device or a projection device. Thus, while a processing system 100 such as shown in FIG. 18 is prior art, a system that includes the instructions to implement aspects of the present invention is not prior art, and therefore FIG. 18 is not labeled as prior art.

The computer system 100 also provides data and control signals via the bus 114 to a graphics hardware card 116. The graphics hardware card 116 typically contains a display processor and other specialised hardware units for processing a series of display instructions found within a memory stored display list to display, e.g. render, graphics primitives. The graphics hardware card 116 receives instructions for the processing, e.g. rendering of image data generated by the processor 102. The display processor supplies data and control signals to a frame buffer which refreshes the display device 120 for displaying, e.g. rendering images. The graphics hardware card 116 is coupled to the display device 114 by an address/data bus which enables them to communicate information.

It is to be noted that the processor 102 or processors may be a general purpose, or a special purpose processor, and may be for inclusion in a device, e.g., a chip that has other components that perform other functions. A suitable processor may be e.g. a Pentium IV available from Intel Corporation. One or more aspects of the present invention can be implemented in digital electronic circuitry, or in computer hardware, firmware, software, or in combinations of them. Furthermore, aspects of the invention can be implemented in a computer program product tangibly embodied in a carrier medium carrying machine-readable code for execution by a programmable processor. Method steps of aspects of the invention may be performed by a programmable processor executing instructions to perform functions of those aspects of the invention, e.g., by operating on input data and generating output data.

Figure 19A:
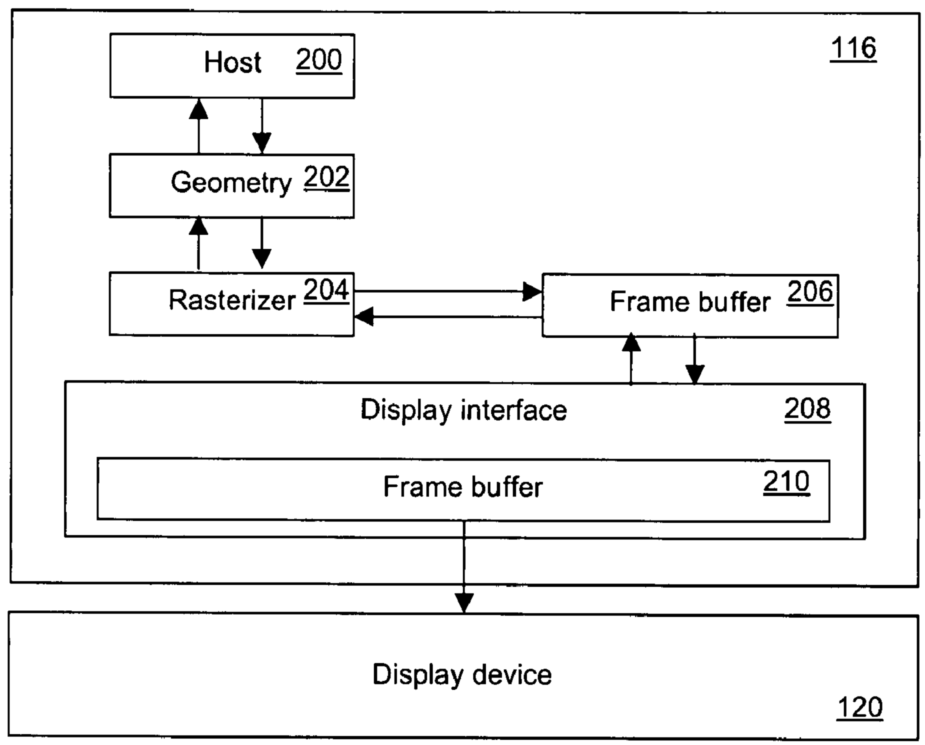
FIG. 19*a* and FIG. 19*b* are block diagrams of graphics hardware cards for use with embodiments of the present invention.
Figure 19B:
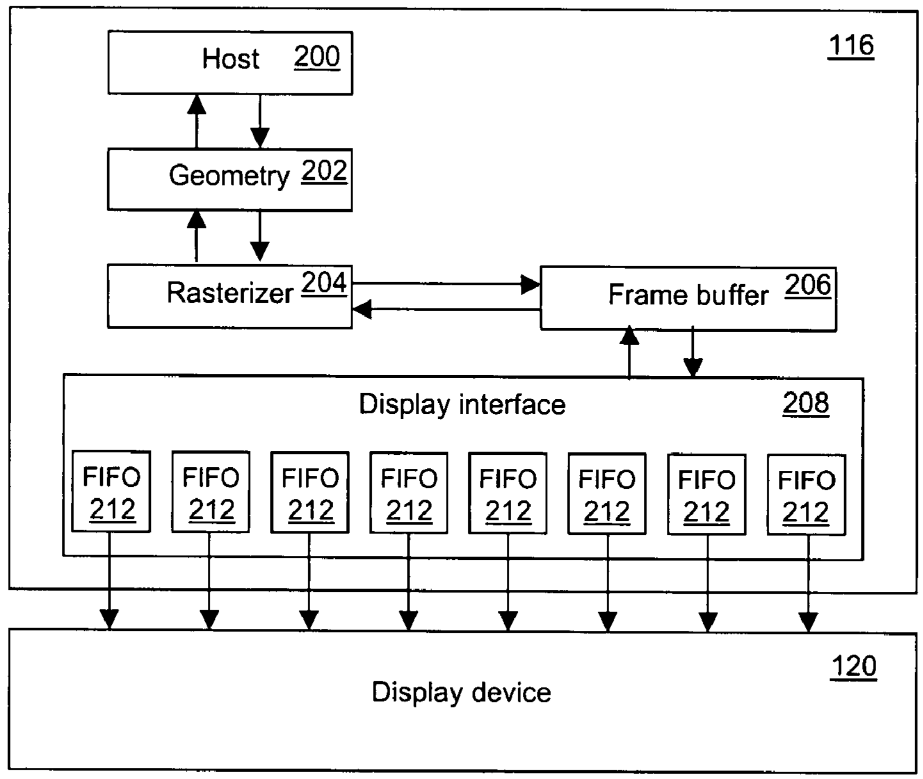

Embodiments of graphics hardware cards 116 are illustrated in FIG. 19*a* and FIG. 19*b*. An application program running on a host processor 200 directs the image processing, e.g. rendering processing in accordance with e.g. column-wise image generation according to an embodiment of the present invention. Alternatively, the application program may direct the image rendering process in accordance with row-wise image generation or tiled image generation in any other suitable way. The application program provides the high-level instructions and data to be used in the image processing, e.g; in rendering processing. This information is passed on to a geometry engine circuit 202 which performs the arithmetic operations on vertices. The vertices are then filled by a rasteriser circuit 204 which performs, a.o. color, blending, anti-aliasing, scan-conversion, depth, texture, lighting and fog functions. The final pixel values of an image are stored within a contiguous section of memory 104 within a frame buffer 206 which may be implemented within the present embodiment using RAM.

A display interface circuit 208 controls the movement of the pixel data from frame buffer 206 to display device 120.

According to one embodiment of the present invention, illustrated in FIG. 19*a*, image data for the different columns to be imaged is combined in a frame buffer 210 in the display interface circuit 208 before being transferred towards the display device 120. Such embodiment reduces latency in image generation compared to typical quadrant-based image generation, as fewer pixels need to be generated before a first line can be started to show.

According to another embodiment, illustrated in FIG. 19*b*, display interface circuit 208 has a plurality of display channels, for example eight display channels in the case of column-wise display as in the embodiment illustrated in FIG. 17*a*, wherein each display channel maps to a particular portion of the pixel display of display device 120. Specifically, each display channel maps to a narrow strip or column subsection of the pixel display of the display device 120. Each of the display channels within the display interface 208 has a first-in-first-out (FIFO) circuit 212 associated with it. Each of the FIFO circuits 212 requests pixel data of the stored image from specific addresses of the frame buffer 206. That is, a block of specific memory addresses are designed to each one of the FIFO circuits 212 from which they can request pixel data. As such, frame buffer 206 is basically divided into a plurality of subsections, e.g. eight, from which the FIFO circuits 212 request pixel data. The plurality of subsections of the frame buffer 206 form the plurality of column subsections of equal size that extend the full height of the pixel display of the display device 120. It should be appreciated that each of the FIFO circuits 212 stores and maintains a particular amount of pixel data. Once the pixel data is stored within the FIFO circuits 212, they output the stored pixel data in parallel to the display device 120 over a plurality of wires.

This embodiment, although still showing the improved latency advantage, has the disadvantage with regard to the previous embodiment that a plurality of display channels each has to map a particular portion of the display device 120, thus requiring a non-standard display device.

It is to be noted that, whereas hereinabove a single graphics hardware card 116 is used to interface with display device 120, multiple graphics hardware cards may be used to interface with a single display device.

It is to be understood that although preferred embodiments, specific constructions and configurations, have been discussed herein for devices and methods according to the present invention, various changes or modifications in form and detail may be made without departing from the scope and spirit of this invention.

The invention claimed is:

1. A display processing system for providing video signals for displaying an image, comprising:

input channels for receiving a plurality of component images, each component image being a portion of a complete image for display, image data of each component image being defined by a split frustum design where the view frustum is split into at least two frustums with non-coplanar near clipping planes;

a combiner for combining the image data of the component images into image data for the complete image, the combiner including warping means for shaping the component images; and an imaging means for receiving the combined image data and producing an image, wherein the imaging means is part of a projection device.

2. A display processing system according to claim 1, furthermore comprising means for providing a plurality of component images.

3. A display processing system according to claim 2, wherein the means for providing a plurality of component images is at least one image generator.

4. A display processing system according to claim 2, wherein the means for providing a plurality of component images is an array of video cameras.

5. A display processing system according to claim 2, wherein the means for providing a plurality of component images are adapted to provide component images in the form of column subsections of the image to be displayed.

6. A display processing system according to claim 2, wherein the means for providing a plurality of component images furthermore comprise synchronisation means for synchronising the provision of the component images.

7. A display processing system according to claim 1, wherein the projection device comprises a light source for generating a beam of light, the imaging means comprising a spatial light modulator for modulating the beam of light from the light source in accordance with the combined image data, for projection.

8. A display processing system according to claim 1, wherein the imaging means is a direct view display.

9. A display processing system according to claim 1, the imaging means being adapted for producing an image having an imaging resolution, wherein the means for providing the plurality of component images is adapted to provide component images of a resolution so that a combined resolution of the combined image data of the component images has a resolution which is larger than the imaging resolution.

10. A display processing system according to claim 1, adapted for accepting component image data from multiple video sources and combining these sources to form a complete image.

11. A display processing system according to claim 1, wherein one of the clipping planes is at an angle with respect to the imaging means.

12. A method for processing image data, comprising:

outputting a plurality of component images with an image generator or an array of video cameras;

receiving the component images with input channels of a display processing system, each component image being a portion of a complete image to be displayed, image data of each component image being defined by a split frustum design where the view frustum is split into at least two frustums with non-coplanar near clipping planes;

combining the image data of the component images into image data for the complete image with a combiner of the display processing system; and displaying the complete image with an imaging means or a projection device of a display system.

13. A method for processing image data according to claim 12, furthermore comprising imaging the combined image data, thus producing an image.

14. A method according to claim 12, furthermore comprising a first warping of the image data with warping means of the combiner for shaping the component images before combining the image data of the component images, in order to take into account the non-coplanarity of the near clipping planes of the view frustums.

15. A method according to claim 14, wherein the first warping additionally takes into account aberrations introduced by an imaging means.

16. A method according to claim 14, furthermore comprising a second warping of the image data before combining it, the second warping being a global warping for the plurality of component images.

17. A method according to claim 14, furthermore comprising a second warping of the image data after combining, the second warping taking into account aberrations introduced by an imaging means.

18. A method according to claim 12, wherein providing a plurality of component images comprises providing column subsections of the image to be displayed.

19. A method according to claim 12, wherein providing a plurality of component images comprises providing quadrant subsections of the image to be displayed.

20. A method according to claim 12, wherein providing a plurality of component images comprises providing row subsections of the image to be displayed.

* * * * *